(12) United States Patent
Busch

(10) Patent No.: US 8,653,700 B2
(45) Date of Patent: Feb. 18, 2014

(54) CIRCUIT ARRANGEMENT WITH A POWER INPUT AND AN OPERATING METHOD FOR CONTROLLING A POWER INPUT CIRCUIT

(75) Inventor: Peter Busch, Augsburg (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 531 days.

(21) Appl. No.: 13/002,356

(22) PCT Filed: Jul. 18, 2008

(86) PCT No.: PCT/EP2008/059475
§ 371 (c)(1),
(2), (4) Date: Jan. 12, 2011

(87) PCT Pub. No.: WO2010/000339
PCT Pub. Date: Jan. 7, 2010

(65) Prior Publication Data
US 2011/0101775 A1 May 5, 2011

(30) Foreign Application Priority Data
Jul. 3, 2008 (DE) .......................... 10 2008 031 536

(51) Int. Cl.
*H01H 31/10* (2006.01)
(52) U.S. Cl.
USPC .......................................................... 307/115
(58) Field of Classification Search
USPC .......................................................... 307/115
See application file for complete search history.

(56) References Cited

U.S. PATENT DOCUMENTS

| 3,569,826 A | 3/1971 | Burnett |
| 5,233,509 A | 8/1993 | Ghotbi |
| 5,466,998 A | 11/1995 | Kinoshita et al. |

(Continued)

FOREIGN PATENT DOCUMENTS

| CN | 101009080 | 8/2007 |
| DE | 30 28 986 | 3/1982 |

(Continued)

OTHER PUBLICATIONS

VDE-Norm "Einrichtungen der Informationstechnik-Sicherheit,"DIN EN 60950-1 (which corresponds to the International Norm IEC 60950-1), 1 page English Summary.

*Primary Examiner* — Stephen W Jackson
*Assistant Examiner* — Joseph Inge
(74) *Attorney, Agent, or Firm* — DLA Piper LLP (US)

(57) ABSTRACT

A circuit arrangement with a power input and at least one power supply unit that generates a DC voltage for operating an electronic device including a power input circuit inserted between the power input and the at least one power supply unit that selectively disconnects or rectifies an AC voltage provided via the power input for the at least one power supply unit, wherein the power input circuit has at least one first semiconductor switching element that switches a first electrical load path with a current limiting element from the power input to the at least one power supply unit, and at least one second semiconductor switching element that switches a second electrical load path from the power input to the at least one power supply unit, and a power input filter, wherein the power input filter includes a first filter circuit arranged between the power input and the power input circuit and a second filter circuit arranged between the power input circuit and the at least one power supply unit.

23 Claims, 3 Drawing Sheets

(56) References Cited

U.S. PATENT DOCUMENTS

| | | |
|---|---|---|
| 5,650,924 A | 7/1997 | Huh |
| 5,668,712 A | 9/1997 | Cassese et al. |
| 5,777,866 A | 7/1998 | Jacobs et al. |
| 5,994,889 A | 11/1999 | Goller et al. |
| 6,031,749 A | 2/2000 | Covington et al. |
| 6,239,996 B1 | 5/2001 | Perreault et al. |
| 6,316,844 B1 | 11/2001 | Arima |
| 6,346,797 B1 | 2/2002 | Perreault et al. |
| 6,411,535 B1 | 6/2002 | Roux |
| 6,456,514 B1 | 9/2002 | Perreault et al. |
| 6,671,195 B2 | 12/2003 | Perreault et al. |
| 6,690,150 B2 | 2/2004 | Pelletier et al. |
| 6,738,274 B2 | 5/2004 | Prasad et al. |
| 6,900,997 B2 | 5/2005 | Perreault et al. |
| 6,912,142 B2 | 6/2005 | Keim et al. |
| 6,912,412 B2 | 6/2005 | Keim et al. |
| 7,269,038 B2 | 9/2007 | Shekhawat et al. |
| 7,283,896 B2 | 10/2007 | Lin |
| 7,531,917 B2 | 5/2009 | Stone et al. |
| 7,667,988 B2 | 2/2010 | Haeberle et al. |
| 2002/0012258 A1 | 1/2002 | Nagai et al. |
| 2002/0012261 A1* | 1/2002 | Moindron .................. 363/127 |
| 2003/0202296 A1* | 10/2003 | Hamano et al. ................ 361/2 |
| 2003/0218838 A1 | 11/2003 | Poulsen |
| 2005/0254267 A1 | 11/2005 | Turvey |
| 2006/0139965 A1 | 6/2006 | Gan et al. |
| 2007/0103001 A1 | 5/2007 | Chiozzi et al. |
| 2007/0217233 A1 | 9/2007 | Lim et al. |
| 2007/0226694 A1* | 9/2007 | Neufeld et al. ............... 717/126 |
| 2007/0291522 A1 | 12/2007 | Toba et al. |
| 2008/0084718 A1 | 4/2008 | Ingman |

FOREIGN PATENT DOCUMENTS

| | | |
|---|---|---|
| DE | 30 45 715 A1 | 6/1982 |
| DE | 43 27 665 | 2/1995 |
| DE | 101 06 132 A1 | 8/2002 |
| DE | 10 2005 049 909 A1 | 7/2006 |
| EP | 0 179 982 B1 | 5/1986 |
| EP | 1 176 688 A1 | 1/2002 |
| EP | 1 231 698 A2 | 8/2002 |
| EP | 1 783 887 A1 | 5/2007 |
| EP | 1 564 618 | 8/2007 |
| JP | 58-212369 A | 12/1983 |
| JP | 61-4418 | 1/1986 |
| JP | 62-233815 A | 10/1987 |
| JP | 2-133808 A | 5/1990 |
| JP | 3-198661 | 8/1991 |
| JP | 3-126396 | 12/1991 |
| JP | 5-316723 | 11/1993 |
| JP | 6-339692 | 12/1994 |
| JP | 7-241077 | 9/1995 |
| JP | 8-308236 A | 11/1996 |
| JP | 9-140138 | 5/1997 |
| JP | 2002-10492 A | 1/2002 |
| JP | 2004-72846 | 3/2004 |
| JP | 2004-147409 | 5/2004 |
| JP | 2005-210809 A | 8/2005 |
| WO | 2007/129469 | 11/2007 |

* cited by examiner

CIRCUIT ARRANGEMENT WITH A POWER INPUT AND AN OPERATING METHOD FOR CONTROLLING A POWER INPUT CIRCUIT

RELATED APPLICATIONS

This is a §371 of International Application No. PCT/EP2008/059475, with an international filing date of Jul. 18, 2008 (WO 2010/000339 A1, published Jan. 7, 2010), which is based on German Patent Application No. 10 2008 031 536.2, filed Jul. 3, 2008, the subject matter of which is incorporated by reference.

TECHNICAL FIELD

This disclosure relates to a circuit arrangement with a power input and at least one power supply unit for generating a DC voltage for operating an electronic device. The disclosure further relates to an operating method for driving such a power input circuit that is suitable for integration into such a circuit arrangement.

BACKGROUND

Circuit arrangements with a power input and at least one power supply unit for generating a DC voltage for operating an electronic device are widely known. In particular, an ever larger number of devices in communications and entertainment electronics require at least one power supply unit to generate a rectified low voltage in the range of 1-24 V from the ordinary 230 VAC mains voltage. The power supply units that are used in that instance must satisfy different, to some extent contradictory, requirements.

First, the power supply unit must be electronically switched on and off, i.e., without actuating a mechanical switch. This has the advantage, among others, that it is possible to do without high-voltage resistant, relatively expensive power switches and expensive cabling and electromagnetic shielding in a device housing. In addition, such a device can be switched on via a timer or other electronic controller.

Second, the power supply unit and the device connected to it should consume as little power from the power grid as possible in a shut-off or standby state to avoid unnecessary use of energy. Currently available devices generally consume a few watts of power in so-called "stand-by" mode, which leads to unnecessary emissions of greenhouse gases for power generation.

Third, efficiency of the power supply unit must be as high as possible, and the noise power fed from it into the mains network must be as low as possible. For this purpose, the power supply unit must comply with increasingly strict requirements of regulatory agencies and power grid operators.

Switched-mode power supply units with upstream network filters and circuits for correcting the power factor are generally used to supply relatively large and rapidly varying loads. A clock frequency or a duty factor of a control signal is generally used to control the load. A disadvantage of such circuits is that they have a relatively high power loss, particularly in standby mode, an operating mode with a very low output power.

It could therefore be helpful to provide a circuit arrangement that satisfies the requirements mentioned above particularly well, in particular, a circuit arrangement and an operating method for controlling a power input circuit whose power consumption from a power grid in the energy-saving state is minimal are to be described. It could also be helpful to provide, in the energy-saving state, an arrangement that preferably does not consume any electrical energy from the power grid at all. In addition, the circuit arrangement should, to the extent possible, contain no mechanical or electromechanical switching elements and be constructed relatively simply.

SUMMARY

I provide a circuit arrangement with a power input and at least one power supply unit that generates a DC voltage for operating an electronic device including a power input circuit inserted between the power input and the at least one power supply unit that selectively disconnects or rectifies an AC voltage provided via the power input for the at least one power supply unit, wherein the power input circuit has at least one first semiconductor switching element that switches a first electrical load path with a current limiting element from the power input to the at least one power supply unit, and at least one second semiconductor switching element that switches a second electrical load path from the power input to the at least one power supply unit, and a power input filter, wherein the power input filter includes a first filter circuit arranged between the power input and the power input circuit and a second filter circuit arranged between the power input circuit and the at least one power supply unit.

I also provide a circuit arrangement with a power input and at least one power supply unit that generates a DC voltage for operating an electronic device, including a power input circuit inserted between the power input and the at least one power supply unit that selectively disconnects or rectifies an AC voltage provided via the power input for the at least one power supply unit, wherein the power input circuit has at least one first semiconductor switching element that switches a first electrical load path with a current limiting element from the power input to the at least one power supply unit, and at least one second semiconductor switching element that switches a second electrical load path from the power input to the at least one power supply unit, and a drive circuit that drives the at least one first semiconductor switching element and the at least one second semiconductor switching element, wherein the drive circuit opens the first semiconductor switching element and the second semiconductor switching element in an energy-saving state, closes at least the second semiconductor switching element at least temporarily in an operating state, and closes only the first semiconductor switching element in a transitional phase from the energy-saving state to the operating state, the second semiconductor switching element remaining open.

I further provide an operating method for driving a power input circuit with at least one first semiconductor switching element for switching a first electrical load path with a current-limiting element from a power input to at least one power supply unit and at least one second semiconductor switching element for switching a second electrical load path from the power input and to the power supply unit, including opening the first and the second semiconductor switching element in an energy-saving state, at least temporarily closing the first semiconductor switching element and leaving the at least one second semiconductor switching element open in a transition phase from the energy-saving state to an operating state, and at least temporarily closing the at least one second semiconductor switching element in the operating state.

DETAILED DESCRIPTION

Figure 1:
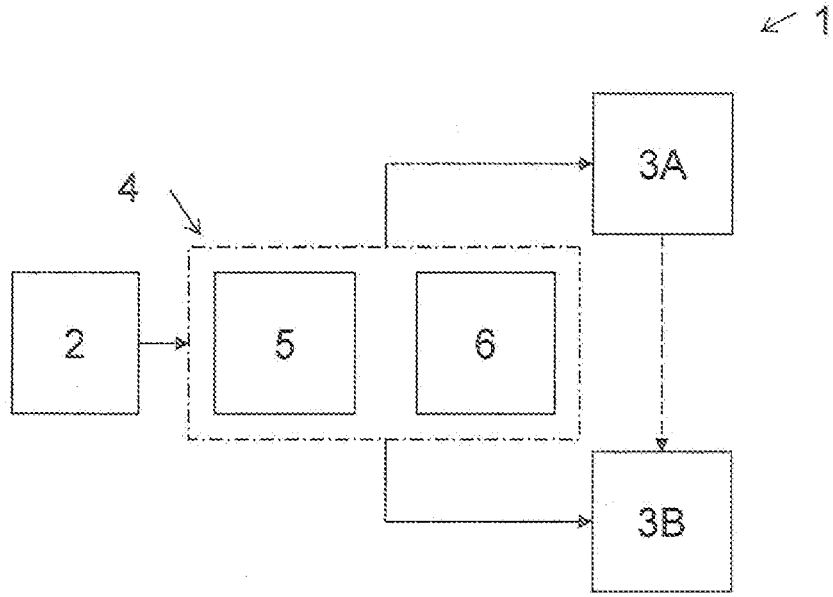
FIG. 1 shows a schematic representation of a circuit arrangement with a power input circuit.

We provide a circuit arrangement of this generic type that may have a power input circuit inserted between the power input and the at least one power supply unit for selective disconnection or rectification of an AC voltage provided for the at least one power supply unit via the power input. The power input circuit has at least one first semiconductor switching element for switching at least one first electrical load path with a current limiting element from the power input to the at least one power supply unit, and at least one second semiconductor switching element for switching at least one second electrical load path from the power input to the at least one power supply unit.

Due to the fact that the power input circuit can selectively disconnect the at least one power supply unit from the grid voltage, power loss in the energy-saving state of the at least one power supply unit can be avoided. By selectively rectifying the provided AC voltage by means of the power input circuit, it is possible to forgo the use of an additional rectifier in or upstream of the at least one power supply unit.

A load current for the at least one power supply unit alternatively flows in a first electrical load path with a current-limiting element, or in a second electrical load path from the power input to the power supply unit. Due to the use of a current-limiting element in the first load path, an overload of the provided AC voltage by the power supply unit during switching-on can be prevented. By switching the second electrical load path, a power loss due to the current-limiting element in normal operation of the power supply unit can be prevented.

The at least one semiconductor switching element and/or the second semiconductor switching element may be a thyristor. The use of a thyristor allows a selective disconnection or rectification of a provided AC voltage by a relatively simple circuit construction.

The power input circuit may have at least one rectifier circuit with a semiconductor bridge rectifier, and the at least one second semiconductor switching element forms a part of the semiconductor bridge rectifier. By combining the functions of selective disconnection or rectification in the second semiconductor switching element, the power loss of the power input circuit is reduced.

The circuit arrangement may be characterized by a power input filter, wherein the power input filter comprises a first filter circuit arranged between the power input and the power input circuit and a second filter circuit arranged between the power input circuit and the at least one power supply unit. By dividing the power input filter into a first filter circuit arranged on the input or grid side and a second filter circuit arranged on the output or power supply unit side, reactive or lost power of the circuit arrangement in an energy-saving state can be further reduced.

The circuit arrangement circuit may be characterized by an overvoltage filter, the overvoltage filter being arranged between the power input circuit and the at least one power supply unit. By arranging the overvoltage filter downstream of the power input circuit, it uses no electrical energy in the energy-saving state.

The circuit arrangement may be characterized by a drive circuit for driving the at least one first semiconductor switching element and the at least one second semiconductor switching element, wherein the drive circuit is set up to open the first semiconductor switching element and the second semiconductor switching element in an energy-saving state and to close the second semiconductor switching element, to temporarily close the at least one second semiconductor switching element in an operating state, and to close only the first semiconductor switching element at least temporarily in a transition phase from the energy-saving state to the operating state, wherein the second semiconductor switching element remains open.

Power consumption of the circuit arrangement in the energy-saving state can be completely or almost completely avoided by opening or switching off the semiconductor switching elements in the energy-saving state. By closing or switching on only the first semiconductor switching element in a transition phase and leaving the second semiconductor switching element open, a current surge when the circuit arrangement is switched into the operating state is limited by the current-limiting element. By closing the second switching element in an operating state, the creation of an undesired power loss at the current-limiting element is avoided.

The circuit arrangement may be set up to supply the drive circuit in the energy-saving state and/or the transition phase with an energy storage device preferably arranged in the electronic device. By supplying the drive circuit from an energy-storage device in the transition phase and/or the energy-saving state, drawing electric power from the power input in these states can be forgone.

The circuit arrangement may be set up to supply the drive circuit with energy in the operating state by means of the at least one power supply unit. By supplying the drive circuit in the operating state with the at least one power supply unit, the load on the energy storage device can be reduced.

The drive circuit may comprise at least one third semiconductor switching element, by which a first drive circuit for driving the at least one first semiconductor switching element and a second drive circuit for driving the at least one second semiconductor switching element can be coupled to one another. By selective coupling of a first drive circuit and second drive circuit, circuitry for driving the first and second semiconductor elements can be simplified.

An operating method may be provided for driving a power input circuit with at least one first semiconductor switching element for switching a first electrical load path with a current-limiting element from a power input to at least one power supply unit and at least one second semiconductor switching element for switching a second electrical load path from the power input to the power supply unit. The operating method comprises:

opening the first and second semiconductor switching elements in an energy-saving state;

at least temporarily closing the first semiconductor switching element and leaving the at least one second semiconductor switching element open in a transition phase from the energy-saving state to an operating state; and at least temporarily closing the at least one second semiconductor switching element in the operating state.

By such an operating method, an electrical connection between the first power input and the power supply unit is initially interrupted in an energy-saving state to prevent or minimize power consumption. In an additional step, the first semiconductor switching element is closed to provide an initial operating current via the at least one electrical load path to the power supply unit, wherein the current-limiting element limits an increase of the power consumption. Finally a power loss in the operating state caused by the current-limiting element is avoided by closing the second semiconductor switching element.

Additional advantageous configurations are disclosed in the description below. My methods and apparatus will be explained in detail with reference to the examples and the figures below.

FIG. 1 shows a schematic representation of a circuit arrangement 1 for supplying an electronic device with an operating voltage. The circuit arrangement 1 in accordance with FIG. 1 comprises a power input 2, a power input circuit 4, and a first and second power supply unit 3A and 3B.

The power input 2 is used for coupling the circuit arrangement 1 to an AC voltage of a power supply network, for example, an AC network with a voltage of 230 V. The power input circuit 4 is used to prepare and filter the AC voltage received by the power input 2 for the downstream power supply units 3A and 3B.

An arrangement with two power supply units 3A and 3B is shown in FIG. 1. For example, the first power supply unit is an auxiliary power supply unit 3A for supplying the electronic device in an operating mode with reduced power consumption, and the normal power supply unit 3B is a main power supply unit for normal operation of the electronic device. The first power supply unit 3A is optionally connected to the second power supply unit 3B, for example, to enable a starting process for starting the second power supply unit 3B by the first power supply unit 3A.

The use of two differently dimensioned power supply units has the advantage that a relatively high efficiency of the circuit arrangement can be achieved even in an operating mode with a reduced power consumption. Of course, the power input circuit described herein is also suitable for those arrangements with only a single power supply unit.

In the schematic representation according to FIG. 1, the power input circuit 4 comprises a power input filter 5 and a rectifier circuit 6. The power input filter filters out noise from the power grid and/or noise caused by the power supply units 3A and 3B. Particularly for switched-mode power supplies, relatively large, high-frequency currents due to the switching appear at the power supply units 3A and 3B, which can lead to a malfunction of the power supply network. Therefore the power input filter 5 comprises a low-pass filter, for example.

Before turning to the various examples for solving the fundamental problem, a conventional circuit arrangement will first be explained.

Figure 2:
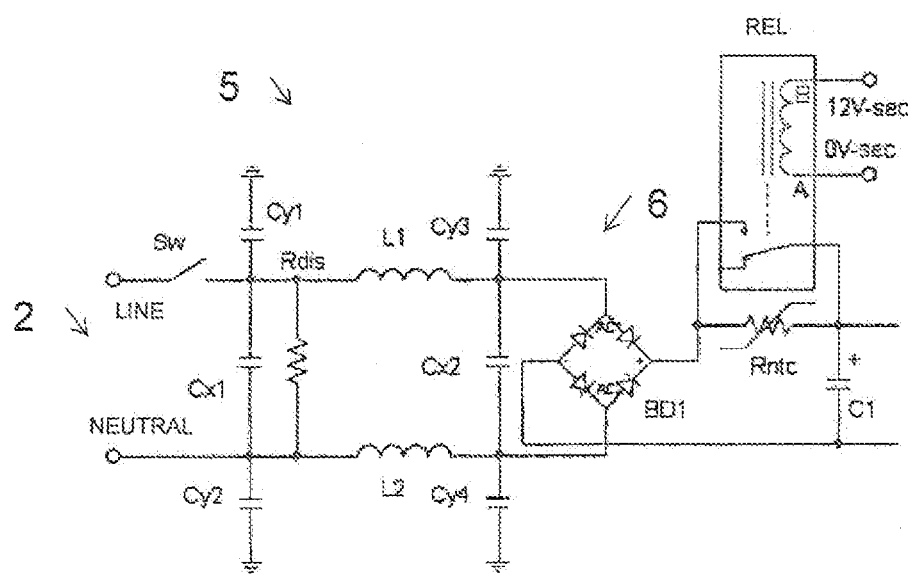
FIG. 2 shows a conventional power input circuit.

FIG. 2 shows a circuit arrangement 1' according to the prior art. The circuit arrangement 1' comprises a power input 2 in the form of a phase input LINE and a neutral conductor NEUTRAL, which are coupled via a power input filter 5 to a rectifier circuit 6 in the form of a bridge rectifier BDI. The power input filter 5 comprises x-capacitors Cx1 and Cx2 arranged between the phase input LINE and neutral conductor NEUTRAL, y-capacitors Cy1, Cy2, Cy3, Cy4 arranged between the neural conductor NEUTRAL and electrical ground, suppression inductors L1 and L2 arranged respectively in the phase line LINE and the neutral conductor NEUTRAL, and a resistor Rdis inserted between the phase line LINE and the neutral conductor NEUTRAL. The bridge rectifier BDI comprises four diodes that are arranged in a so-called "Graetz bridge" and convert an AC voltage at the terminals AC1 and AC2 into a pulsating DC voltage at the terminals + and −. The actual power supply unit is not shown in FIG. 2. In the circuit arrangement 1' of FIG. 2 it was connected in parallel to the storage capacitor labeled C1.

To avoid a large charging current in the phase line LINE when the power supply unit is switched on by the switch Sw, a current-limiting element in the form of an NTC resistor Rntc is inserted between the rectifier BDI and the storage capacitor C1. The NTC resistor limits the charge current of the capacitor C1 when it is turned on. To avoid the parasitic load of the NTC resistor Rntc in the operation of the circuit arrangement 1, a monostable relay REL is provided. The current-limiting element Rntc can be bridged by applying a voltage of, for example, twelve volts between the control terminals A and B of the relay REL.

One disadvantage of the circuit arrangement 1' shown in FIG. 2 is that the relay REL must always be supplied with a supply voltage in the operating state to bridge the current-limiting element. Another disadvantage is that the power input filter 5 and the storage capacitor C1 are always connected to the power supply network when the switch Sw is closed. Even if a power supply unit were to draw no charge from the storage capacitor C1, the power input filter 5 would lead to reactive and lost power by the circuit arrangement 1. The discharge resistor Rdis of the power input filter 5 also contributes to the power loss of the circuit arrangement 1' in a switched off or energy-saving state of the power supply unit 3. This is necessary for safety reasons to discharge the x-capacitors Cx1 to Cx2, which can have a capacitance of more than 100 nF, in a controlled manner when the power supply is switched off. Finally, the switch Sw must be designed to be resistant to current surges to guarantee a safe and repeated switching on and off of the circuit arrangement 1'.

Figure 3:
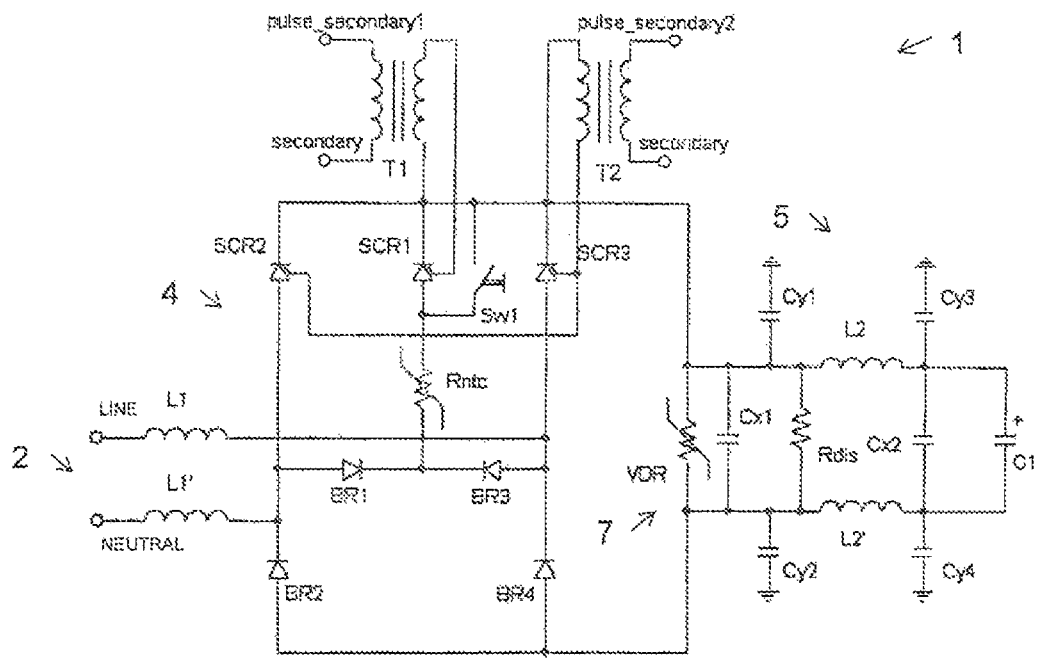
FIG. 3 shows a power input circuit according to a first example.

FIG. 3 shows one example of a circuit arrangement 1. The circuit arrangement 1 again comprises a power input 2 with a phase line LINE and a neutral conductor NEUTRAL. In addition, the power input 2 has two very small-dimensioned filter elements L1 and L1'. For example, the latter can be annular ferrite elements, through which a power input line of the circuit arrangement 1 is run. The circuit arrangement 1 further comprises a power input circuit 4 comprising four diodes BR1-BR4 as well as three thyristors SCR1-SCR3. The power input circuit 4 further comprises a current-limiting element in the form of an NTC resistor Rntc, as well as a switch Sw1 for bridging the thyristor SCR1. The switch Sw1 is used for short-time switching over between the energy-saving state without power consumption and a conventional standby state, in which power is drawn from the power supply network. This bridging can be used, for example, to charge the storage capacitor C1 and thus allow the start-up of a power supply unit 3 even if an activation of the thyristor SCR1 is no longer possible on the secondary side, for example, because a battery cell provided for this purpose was completely discharged.

An overvoltage filter 7 in the form of a voltage-dependent resistor VDR is arranged at the output of the power input circuit 4. The resistor VDR is not necessary for the functioning of the circuit arrangement 1, however. Finally, the circuit arrangement 1 comprises a power input filter 5 that is arranged between the power input circuit 4 and a storage capacitor C1. A power supply unit 3 not shown in FIG. 3 is connected in parallel to the storage capacitor C1.

The power input circuit 4 is driven by two transformers T1 and T2. The drive circuit required for this is not shown in FIG. 3, however.

The operation of the circuit according to FIG. 3 will be explained in detail using the state diagram in accordance with FIG. 4.

In a switched-off or energy-saving state Z0, the thyristors SCR1-SCR3 block. Thus, there is no electrically conductive path from the power input LINE to the neutral conductor NEUTRAL, so that no current flows in FIG. 3 and neither lost power nor reactive power appears.

By applying a signal sequence of pulses to the transmitter T1, a pulse train is transmitted to the control terminal of the thyristor SCR1. Since no zero crossing recognition is performed in the circuit according to FIG. 3, a permanent DC voltage can be applied according to a first configuration as a control signal to the thyristor SCR1. For the functioning of the circuit, it is sufficient at a frequency of 50 Hz, however, to generate a drive pulse roughly every 2 ms, so that the thyristor is triggered approximately 10 times per power supply wave period. This causes the thyristor SCR1 to become conductive in one direction and thus act as a semiconductor switching element. This is shown as a step 31 in FIG. 4.

If there is a positive half wave on the phase line LINE, the current flows in the circuit according to FIG. 3 from the phase input LINE via the filter element L1, the diode BR3, the current limiting element Rntc, and the thyristor SCR1 to the power input filter 5 and the storage capacitor C1. The return flow from the power input filter 5 and the storage capacitor C1 to the neutral conductor NEUTRAL takes place via the diode BR2 and the filter element L1'. In the opposite case, i.e., with a negative half wave at the phase input LINE, a current flows from the neutral conductor NEUTRAL via the filter element L1', the diode BR1, the NTC resistor Rntc, and the thyristor SCR1 to the power input filter 5 and the storage capacitor C1, and from there back to the phase input LINE via the diode BR4 and the filter element L1.

By connecting the phase line LINE and the neutral conductor NEUTRAL via the diodes BR1, BR2, BR 3, and BR4, the thyristor SCR1 can therefore be used in both pathways for activating or deactivating the circuit arrangement 1. Thus only a single switching element in the circuit arrangement 1 is necessary to charge the storage capacitor C1.

If the storage capacitor C1 has been charged and the connected power supply unit 3 has begun operation, the thyristors SCR2 and SCR3 are also driven in an additional step 32a. According to FIG. 3, a second control signal is applied to the second transformer T2 for this purpose. The output of the second transformer T2 is connected to both thyristors SCR2 and SCR3, so that they are driven jointly in the illustrated exemplary embodiment. Optionally, the thyristor SCR1 can be opened simultaneously or later in a step 32b, for example, by not transmitting any additional control signals to the first transformer T1. Is not essential to the functioning and the efficiency of the circuit arrangement 1 because the current always chooses the path of least electrical resistance when the thyristors SCR2 and SCR3 are triggered.

The thyristors SCR2 and SCR3 are advantageously driven with a higher frequency than the driving of the thyristor SCR1, for example, a frequency of 1 kHz. Depending on the phase position of the power supply voltage and the quality of the power input filter, relatively large current surges and/or the generation of whistling noises can take place however. To avoid this, it is advisable to use a drive frequency of roughly 3 kHz or even better, 5 kHz. A higher frequency relative to the frequency of the power supply network has the advantage that no large charging interruptions appear after a zero crossing of the supply voltage, and therefore a noise level of the circuit arrangement is further reduced. For further improvement of the drive circuit, the duty ratio used for driving the transformer T2 can be selected larger than the duty ratio of the transformer T1 to compensate for the shorter driving periods and guarantee a secure triggering of the thyristors SCR2 and SCR3.

In a positive half wave on the phase line LINE, a current flows via the filter element L1 and the thyristor SCR3 to the power input filter 5 and the storage capacitor C1. From there the current flows back to the neutral conductor NEUTRAL via the diode BR2 and the filter element L1'. In the opposite case, i.e., in case of a negative half wave, the current flows from the neutral conductor NEUTRAL via the filter element L1' and the thyristor SCR2 to the power input filter 5 and the storage capacitor C1. The power flows back from there to the phase input LINE via the diode BR4 and the filter element L1.

In the circuit arrangement according to FIG. 1 with a first power supply unit 3a and a second power supply unit 3b, a multistage switch-on method can also be used. After the initial charging of the storage capacitor C1, it is possible, for example, to start only the first power supply unit 3a, a relatively low-power auxiliary power supply unit in this example, and to use the output current of the first power supply unit 3a to drive the thyristors SCR2 and SCR3. Only then is a corresponding control device, such as a microcontroller, started, as well as the second power supply unit 3b, a more powerful power supply unit, for example.

Figure 4:
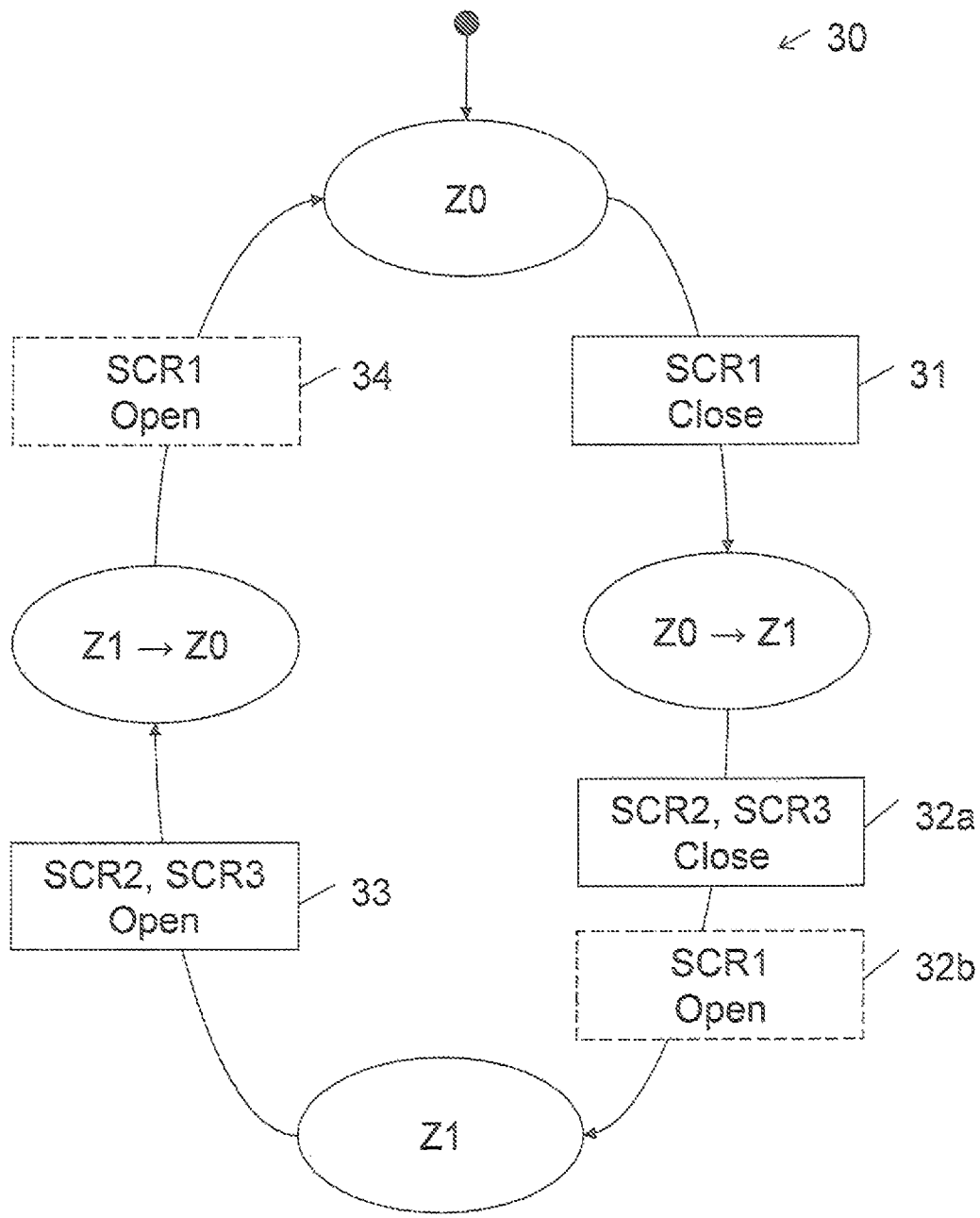
FIG. 4 shows a state diagram of an operating method for controlling a power input circuit.

As is further illustrated in FIG. 4, an essentially opposite switching sequence can be used in switching the circuit arrangement 1 from the operating state Z1 to the energy-saving state Z0. In a first step 33, the thyristors 33 are opened. If the thyristor SCR1 is still closed at this time, the current for operating the power supply unit 3 again flows via the current-limiting element Rntc. If it is already open, a current flow is immediately stopped. It is, of course, also possible to deactivate the thyristor SCR1 simultaneously with the thyristors SCR2 and SCR3, by deactivating the corresponding drive signals, for example.

Closing the first semiconductor switching element or leaving it closed by, for example, supplying the thyristor SCR1 with a continued drive signal, has advantages particularly in case of a failure or malfunction of a supply network connected to the power input 2. If a power network voltage is lost only for a short time, a power surge during the re-provision of the supply voltage can be avoided via the load path characterized by the current-limiting element Rntc. At the same time, the continuous operation of the power supply unit or units is maintained, if the malfunction lasts only such a short time that it can be bridged by the storage capacitor C1.

In another optional step 34, the thyristor SCR1 is also opened or no longer driven so that the power supply unit 3 and the power filter 5 are disconnected by the power input circuit 4 from the power supply network. Thus, the circuit arrangement returns to the operating state Z0, in which it no longer consumes any electric power.

The circuit arrangement 1 according to FIG. 3 has several advantages compared to the circuit arrangement 1' of FIG. 2. First, it is possible to forgo the use of a relay. By using only semiconductor components for disconnecting or connecting the power supply unit 3 from the power input 2, the operating safety of the circuit arrangement 1 is increased.

Moreover, arranging the thyristors SCR2 and SCR3 in a bridge circuit simultaneously provides a rectification function. By uniting the functions of power supply network disconnection and rectification, the efficiency achieved by the circuit arrangement 1 overall is increased. It is true that a slightly higher voltage drops at the thyristors SCR2 and SCR3 than at the diodes of a conventional bridge rectifier, but this additional power loss is more than compensated by avoiding an additional rectifier or a relay for bridging the NTC resistor Rntc.

For example, with a rectifier circuit having one thyristor with a voltage drop of 1.0 V and one diode with a voltage drop of 0.8 V per phase, a voltage drop of 1.8 V occurs. For a rectifier circuit with two diodes per phase, on the other hand, a voltage drop of only 1.6 V occurs. For an average load current of 0.5 A, the additional voltage drop of 0.2 V corresponds to extra expenditure of 0.1 W in operation. This extra expenditure is countered by the savings from not driving an additional relay in operation and the additional energy savings in the energy-saving state, so that an overall positive energy balance results.

Furthermore, the circuit arrangement 1 according to FIG. 3 has no suppression capacitors on the primary side, i.e., between the power input 2 and the power input circuit 4. The resistor Rdis necessary for discharging the storage capacitor C1 is likewise disconnected from the power input 2 by the power input circuit 4. Therefore, no loss or reactive power occurs at the power input 2 with the thyristors SCR1-SCR3 open.

Finally, there is no significantly increased requirement for components in comparison to conventional circuit arrangements for supplying power. The circuit arrangement does require the semiconductor switching elements SCR1-SCR3, but mechanical relays or switches are no longer necessary. In addition, the thyristors SCR2 and SCR3 used as switching elements partially replace the rectifier diodes used in conventional circuits.

Figure 5:
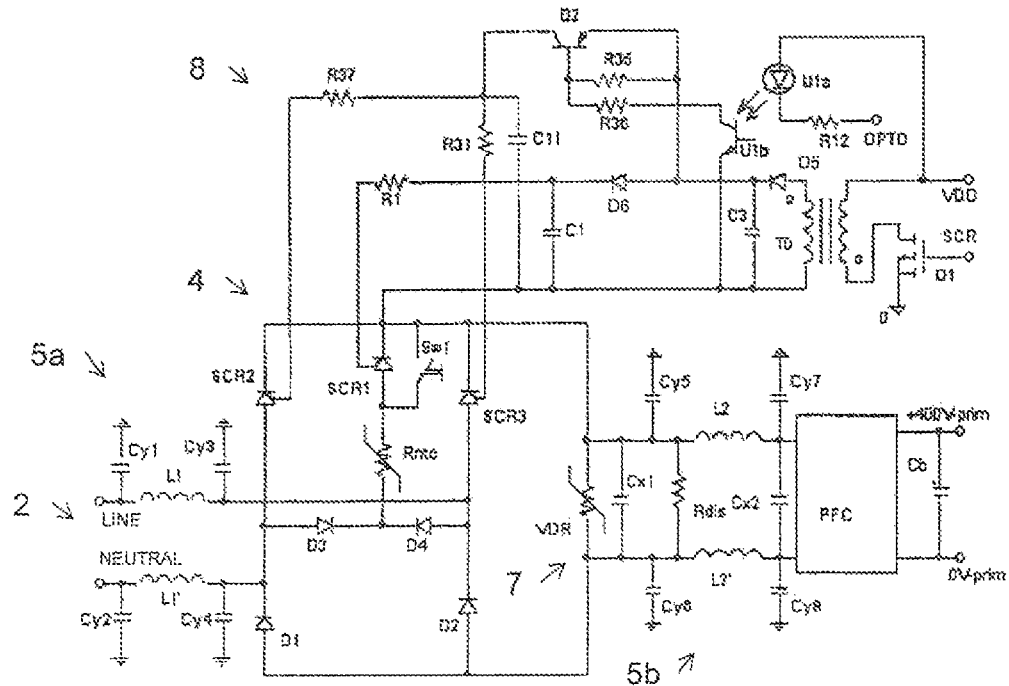
FIG. 5 shows a power input circuit according to a second example.

FIG. 5 shows an additional example of a circuit arrangement 1. The circuit arrangement 1 according to FIG. 5 comprises a first filter circuit 5A arranged between a power input 2 and a power input circuit 4. The circuit arrangement 1 further comprises an overvoltage filter 7 as well as a second filter circuit 5B which are arranged electrically downstream of the power input circuit. Together the filter circuits 5A and 5B form a power input filter 5. Downstream of the second power input filter 5B, a circuit for active power factor correction PFC is arranged. The circuit for power factor correction PFC is used to reduce the interference in the power supply network produced by the switched-mode power supply unit. A storage capacitor and a switched-mode power supply unit 3, not shown in FIG. 5, are connected downstream of the power factor correction circuit PFC.

The power input circuit 4 is very similar to the power input circuit 4 shown in FIG. 3. It again comprises three thyristors SCR1-SCR3 as well as four diodes D1-D4, which together form a disconnectable rectifier circuit 6. The power input circuit 4 additionally comprises a current-limiting element in the form of an NTC resistor Rntc in a first electrical load path, and a second electrical load path via the thyristors SCR2 and SCR3 does not have any such current-limiting means.

A switch Sw1 is again provided to start the circuit according to FIG. 5 even in the case where a secondary-side driving of the thyristor SCR1 is no longer possible, for example, because an energy storage device of a downstream device is exhausted. Differently from the configuration according to FIG. 3, the switch Sw1 does not bridge the thyristor SCR1 from its anode to its cathode, but instead provides a trigger voltage to its control terminal or gate via a series resistor R2. For this purpose, the series resistor R2 is connected between the diodes D3 and D4 and therefore always provides a positive control voltage, independently of the phase position at the power input 2. Alternatively the drive voltage can also be tapped between the NTC resistor Rntc and the first thyristor SCR1. This circuit structure has the advantage that the switch Sw1 need not be constructed to be resistant to current surges. In particular, a control current of only a few milliamperes suffices to trigger the thyristor SCR1.

FIG. 5 additionally shows a drive circuit 8 for driving the thyristors SCR1-SCR3. Unlike the circuit arrangement in FIG. 3, the drive circuit 8 has only a single transformer T0.

The transformer T0 is supplied by a MOSFET transistor Q1 with a pulse signal by means of a control signal SCR. In the example according to FIG. 5, the transformer T0 is used to drive the first thyristor SCR1 with square wave pulses of a first drive frequency, for example, 500 Hz. Alternatively, a variable, more dense train of drive pulses can be generated to securely guarantee triggering of the thyristor SCR1 in all phase conditions. Such a relatively low-frequency drive signal can be generated by a secondary voltage source. The battery cell installed in the circuit arrangement 1 or in an electronic device connected thereto, such as the CMOS battery of a computer or laptop, is suitable for this purpose.

By applying a square wave pulse to the transformer T0, it is first re-magnetized. If the excitation voltage drops, the capacitor C3 will be charged via the diode D5 by the magnetization current from T0, and capacitor C1 will continue to be charged via the diode D6. Then the thyristor SCR1 will be triggered via the series resistor R1. Thereby a voltage results at the capacitor C3 that corresponds to the control voltage of the thyristor SCR1, the voltage drop at the resistor R1 and the additional forward voltage of diode D6, for example, 1.4 to 2 V.

By closing a transistor Q2 of the drive circuit 8, the thyristors SCR2 and SCR3 can additionally be driven by the transformer T0. For this purpose, a control input OPTO of an optocoupler U1 is drawn to ground potential to generate a control signal for the transistor Q2. The resistors R35 and R36 are dimensioned such that the transistor Q2 is well supplied with base current and a voltage drop on the collector-emitter path of Q2 is low, for example, 0.4 V.

In this manner the pulse signal generated by the transformer T0 is also provided for the thyristors SCR2 and SCR3. As described above, the transformer T0 is preferably driven for this purpose with a higher clock frequency, for example 1 kHz, and a higher duty ratio. The diode D6 is used to artificially raise a charge voltage at the capacitor C3 with respect to the voltage at the capacitor C1 to have a voltage reserve for triggering the thyristors SCR2 and SCR3 compared to the triggering of SCR1. In this way it is assured in the normal operating state Z1 that the thyristors SCR2 and SCR3 always securely trigger and that no loss of power results from bridging the current-limiting element Rntc. At the same time the thyristor SCR1 is no longer driven, since only a reduced drive voltage is available at its control terminal.

The circuit arrangement 1 according to FIG. 5 has the advantage that a particularly good interference suppression of a switched-mode power supply becomes possible. Nevertheless, only a part of the power input filter 5 connects to the power supply network in the energy-saving state Z0. The first filter circuit 5A has no resistor and no x-capacitors, so that no real power and only a small amount of reactive power appear in it. The elimination of a resistor is enabled by the fact, among others, that x-capacitors are forgone in the first filter circuit 5A, and additionally that the capacitance of the y-capacitors is on the order of 1 nF, so that there is no need for a discharge resistor.

In addition, the drive circuit 8 is constructed particularly simply. As a matter of course, each semiconductor switching element SCR1-SCR3 must be driven separately. But since the thyristors SCR2 and SCR3 only conduct in a preferred direction anyway, the two thyristors can be driven with a common control signal. By optionally coupling drive circuits for the thyristor SCR1 and for the thyristors SCR2 and SCR3, expense for components and driving is further reduced.

The invention claimed is:
1. A circuit arrangement with a power input and at least one switched-mode power supply unit that generates a DC volt- age for operating an electronic device comprising a power input circuit inserted between the power input and the at least one power supply unit that selectively disconnects or rectifies an AC voltage provided via the power input for the at least one switched-mode power supply unit, wherein the power input circuit has at least one first semiconductor switching element that switches a first electrical load path with a current limiting element from the power input to the at least one switched-mode power supply unit, and at least one second semiconductor switching element that switches a second electrical load path from the power input to the at least one switched-mode power supply unit, and a power input filter, wherein the power input filter comprises a first filter circuit arranged between the power input and the power input circuit and a second filter circuit arranged between the power input circuit and the at least one switched-mode power supply unit.

2. The circuit arrangement according to claim 1, wherein the at least first semiconductor switching element and/or the at least second semiconductor switching element is a thyristor.

3. The circuit arrangement according to claim 1, wherein the power input circuit comprises at least one rectifier circuit with a semiconductor bridge rectifier and the at least one second semiconductor switching element forms a part of the semiconductor bridge rectifier.

4. The circuit arrangement according to claim 1, wherein the power input filter comprises at least one x-capacitor and a discharge resistor for discharging the at least one x-capacitor, wherein the at least one x-capacitor and the discharge resistor are arranged in the second filter circuit of the power filter circuit.

5. The circuit arrangement according to claim 4, wherein the first filter circuit has a capacitance of less than 68 nF and the x-capacitor arranged in the second filter circuit has a capacitance of more than 100 nF.

6. The circuit arrangement according to claim 1, further comprising an overvoltage filter comprising a voltage dependent resistor arranged between the power input circuit and the at least one power supply unit.

7. The circuit arrangement according to claim 1, further comprising a drive circuit that drives the at least one first semiconductor switching element and the at least one second semiconductor switching element, wherein the drive circuit opens the first semiconductor switching element and the second semiconductor switching element in an energy-saving state closes at least the second semiconductor switching element at least temporarily in an operating state, and closes only the first semiconductor switching element at least temporarily in a transition phase from the energy-saving state to the operating state, and wherein the second semiconductor switching element remains open.

8. The circuit arrangement according to claim 7, wherein the circuit arrangement supplies the drive circuit in the energy-saving state and/or the transition phase with energy provided by an energy storage device of the electronic device.

9. The circuit arrangement according to claim 8, wherein the energy storage device is arranged in the electronic device.

10. The circuit arrangement according to claim 8, wherein the circuit arrangement supplies the drive circuit in the operating state with energy provided by the at least one switched-mode power supply unit.

11. The circuit arrangement according to claim 7, wherein the drive circuit comprises at least one transformer that galvanically separates the electronic device from the power input circuit.

12. The circuit arrangement according to claim 7, wherein the drive circuit comprises at least one third semiconductor switching element, by which a first drive circuit that drives the first semiconductor switching element and a second drive circuit that drives the at least one second semiconductor switching element can be coupled to one another.

13. The circuit arrangement according to claim 7, wherein the drive circuit generates a clocked control signal with a first, lower frequency in a transition phase and generates a clocked control signal with a second, higher drive frequency in the operating state.

14. The circuit arrangement according to claim 1, further comprising a circuit for active power factor correction for reducing interference in a power supply network connected to the power input produced by the switched-mode power supply unit, wherein the circuit for active power factor correction is arranged between the second filter part and the at least one switched-mode power supply unit.

15. The circuit arrangement according to claim 14, further comprising a storage capacitor, wherein the storage capacitor is arranged between the circuit for active power factor correction and the at least one switched-mode power supply unit.

16. The circuit arrangement according to claim 4, wherein the power input filter further comprises at least two suppression inductors, at least one of the at least two suppression inductors arranged in series between the power input and the power input circuit in a phase line and a neutral line, respectively, and/or at least two y-capacitors having a capacity in the order of 1 nF, at least one of the at least two y-capacitors arranged between the phase line or the neutral line and electrical ground potential, respectively.

17. A circuit arrangement with a power input and at least one switched-mode power supply unit that generates a DC voltage for operating an electronic device, comprising:
a power input circuit inserted between the power input and the at least one switched-mode power supply unit that selectively disconnects or rectifies an AC voltage provided via the power input for the at least one switched-mode power supply unit, wherein the power input circuit has at least one first semiconductor switching element that switches a first electrical load path with a current limiting element from the power input to the at least one switched-mode power supply unit, and at least one second semiconductor switching element that switches a second electrical load path from the power input to the at least one switched-mode power supply unit; and
a drive circuit that drives the at least one first semiconductor switching element and the at least one second semiconductor switching element to electronically switch the electronic device selectively from an energy-saving state to an operation state and vice versa, wherein the drive circuit opens the first semiconductor switching element and the second semiconductor switching element in the energy-saving state of the electronic device, closes at least the second semiconductor switching element at least temporarily in the operating state of the electronic device, and closes only the first semiconductor switching element in a transitional phase from the energy-saving state to the operating state of the electronic device, the second semiconductor switching element remaining open.

18. The circuit arrangement according to claim 17, wherein the power input circuit comprises at least one rectifier circuit with a semiconductor bridge rectifier, and the at least one second semiconductor switching element forms part of the semiconductor bridge rectifier.

19. The circuit arrangement according to claim 17, wherein the power input filter comprises at least one x-capacitor and a discharge resistor for discharging the at least one x-capacitor, wherein the at least one x-capacitor and the discharge resistor are arranged in the second filter circuit of the power filter circuit.

20. The circuit arrangement according to claim 17, wherein the drive circuit generates a clocked control signal with a first, lower drive frequency in the transition phase, and a clocked signal with a second, higher frequency in the operating phase.

21. An operating method for driving a power input circuit with at least one first semiconductor switching element for switching a first electrical load path with a current-limiting element from a power input to at least one switched-mode power supply unit and at least one second semiconductor switching element for switching a second electrical load path from the power input and to the switched-mode power supply unit, comprising:

opening the first and the second semiconductor switching element in an energy-saving state;

at least temporarily closing the first semiconductor switching element and leaving the at least one semiconductor switching element open in a transition phase from the energy-saving state to an operating state; and at least temporarily closing the at least one second semiconductor switching element in the operating state.

22. The operating method according to claim 21, further comprising at least temporarily closing the first semiconductor switching element and opening the at least one second semiconductor switching element in a transition phase from an operating state to the energy-saving state when a malfunction of a supply network connected to the power input has been recognized.

23. The operating method according to claim 21, wherein a clocked control signal with a first, lower drive frequency is generated in the transition phase, and a clocked control signal with a second, higher drive frequency is generated in the operating state.

\* \* \* \* \*